(12) United States Patent
Mantelli

(10) Patent No.: US 7,694,931 B2
(45) Date of Patent: Apr. 13, 2010

(54) ARTIST ASSISTIVE DEVICE

(76) Inventor: Anthony P. Mantelli, 33 Fairveiw Ct., Rochester, NY (US) 14612

( * ) Notice: Subject to any disclaimer, the term of this patent is extended or adjusted under 35 U.S.C. 154(b) by 329 days.

(21) Appl. No.: 11/743,615

(22) Filed: May 2, 2007

(65) Prior Publication Data
US 2008/0272249 A1    Nov. 6, 2008

(51) Int. Cl.
*A47B 19/00*    (2006.01)
(52) U.S. Cl. .................. 248/441.1; 248/444; 248/118.3
(58) Field of Classification Search .............. 248/441.1, 248/118.5, 118.3, 118.1, 451, 444; 33/338, 33/403, 447, 615, 437, 434; 434/117
See application file for complete search history.

(56) References Cited

U.S. PATENT DOCUMENTS

| | | | |
|---|---|---|---|
| 2,089,757 A * | 8/1937 | Nieuwkamp ................. 33/437 |
| 2,190,947 A * | 2/1940 | Kinzler ....................... 33/615 |
| 2,530,437 A * | 11/1950 | Marks ........................ 434/117 |
| 3,638,322 A * | 2/1972 | Cunningham ................ 33/447 |
| 3,815,856 A * | 6/1974 | Cortimilia ................... 248/118 |
| 3,972,133 A | 8/1976 | Parshall |
| 4,088,290 A | 5/1978 | Novello |
| 4,188,006 A | 2/1980 | Karlin |
| 4,481,719 A * | 11/1984 | Grover ........................ 33/437 |
| 4,717,109 A | 1/1988 | Johnston |
| 5,141,198 A | 8/1992 | Hoyt |
| 5,172,883 A | 12/1992 | Amirian |
| 5,193,772 A * | 3/1993 | Johnston ................... 248/118.5 |
| 5,299,772 A | 4/1994 | Weber |
| 5,765,791 A | 6/1998 | Givonetti |
| 6,565,059 B1 * | 5/2003 | Falconer ................... 248/441.1 |
| 6,691,972 B1 | 2/2004 | Oliver |

* cited by examiner

*Primary Examiner*—J. Allen Shriver
*Assistant Examiner*—Todd M. Epps
(74) *Attorney, Agent, or Firm*—Shlesinger & Fitzsimmons

(57) ABSTRACT

An improved artist assistive device provides easy adjustment and support of a mahl. The mahl can be repositioned with one hand, eliminating the need for the artist to lay down a work tool to reposition the mahl as required by the prior art. Embodiments include a second, vertical mahl supported from the top rail. Preferably, the top rail has front and rear members with a gap therebetween in which a slide supporting the second mahl is inserted. With the slide in the gap, the position of the vertical mahl can be adjusted by sliding the support along the top rail.

13 Claims, 5 Drawing Sheets

ARTIST ASSISTIVE DEVICE

CROSS-REFERENCE TO RELATED APPLICATIONS

None applicable.

BACKGROUND AND SUMMARY

For centuries, artists have employed tools to steady their hands and to assist in the drawing of lines on paintings and the like. A favored tool has been the mahl, also known as a maul or mahlstick. The typical mahl is a stick or dowel with padding on one end that the artist holds against the surface on which he or she is working. The artist then can rest his or her other hand on the mahl to steady the hand and/or to draw straighter lines. Clearly, this arrangement can be inconvenient since both hands are occupied with the traditional arrangement. Most artists put up with this inconvenience because the mahl itself is so simple to make and use. However, there have been attempts to provide an improved mahl.

For example, U.S. Pat. No. 3,972,133 to Parshall discloses a mahl stick holder that employs a series of notches in a vertical member to support one end of the mahl while the other end of the mahl is held by the artist's free hand. While moving the mahl off the work surface, this still requires that the artist hold the mahl.

U.S. Pat. No. 4,088,290 to Novello discloses a telescoping mahl that can be mounted across the canvas supported by the uprights of the frame. Alternatively, the mahl can be mounted vertically across the canvas supported by the top and bottom frame members, or can hang from the top member with the free end of the mahl resting on the work surface. The extent of telescopy and the position relative to the frame rail are adjusted with knobs on the mahl that would be difficult to operate with one hand, and in some positions, the artist must still hold the mahl.

U.S. Pat. No. 4,188,006 to Karlin discloses a steadying device in which a first mahl is supported by posts in clamps on the uprights of the canvas frame, while a second mahl is supported by the first mahl and a third post in a clamp on the top member of the canvas frame. The mahls are attached to the posts and to each other with elastic members, such as rubber bands, to allow adjustment relative to the canvas and each other. The clamps must be adjusted with two hands and the mahl must be slid through the elastics to be adjusted.

U.S. Pat. No. 5,141,198 to Hoyt discloses a mahl support in which the mahl has plastic end caps and a hook at one end. The hook is inserted into an eyelet in a bar on the top of the canvas frame and the free end of the mahl is held by the artist's free hand. This is hardly an improvement on the traditional mahl in that the artist must hold the mahl with one hand while working with the other hand.

U.S. Pat. No. 5,172,883 to Amirian discloses an artist tool in which a bar rests atop the canvas frame and slidably and pivotably supports a mahl. The mahl can be slid and pivoted to allow the painting hand to be supported anywhere on the canvas. However, the adjustment requires two hands and the resulting support is not terribly secure.

U.S. Pat. Nos. 5,193,772, and 4,717,109 to Johnston disclose a hand and brush guide for adjustable mahl in the form of a beam, ends of the beam being mounted in carriages. A hand support slides on the beam along the longitudinal axis of the beam, while the carriages allow the beam to be adjusted along the transverse axis of the beam. The carriages are supported at the edges of the work space by rods held on held on the canvas frame with clamps and can include counterweights to facilitate movement of the beam up and down the canvas. This is the most complicated of the devices mentioned here and is quite large and cumbersome. Adjustment of the beam requires two hands, and learning how to use the device itself could be a challenge. The device is very likely to be expensive to manufacture and to purchase.

U.S. Pat. No. 5,299,772 to Weber discloses an artist tool that supports a double-mahl-like hand rest for adjustment in a plane parallel to the work surface and, to some extent, skew to the work surface. The hand rest is supported at one end by a swing clamp mounted on the canvas frame. The clamp requires adjustment with two hands.

U.S. Pat. No. 5,765,791 to Givonett discloses a hand rest in which a pivoting support attaches to an easel leg or other support structure and holds an end of a mahl. The mahl extends over the work space and can be adjusted by pivoting the mahl about the pivoting support. The unsupported end of the mahl is a traditional padded mahl tip that can rest on the work surface while in use. This arrangement provides a wide range of adjustment, but is very cumbersome, complicated, and expensive. Additionally, the use of the device is somewhat involved, requiring two hands to adjust the position of the mahl.

U.S. Pat. No. 6,565,059 to Falconer discloses a hand rest that provides a vertical bar with pegs in it on which one end of a mahl can rest. The other end of the mahl is supposed to be rest on the easel tray or be held by the artist in his or her free hand. While this is somewhat of an improvement over the traditional mahl, the artist still must hold the mahl or take up space in and block access to the easel tray.

U.S. Pat. No. 6,691,972 to Oliver discloses an adjustable hand rest that uses two bars, one on either side of a canvas frame, to support brackets that hold a mahl. The brackets can slide up and down the bars to allow adjustment of the mahl's height and angle. One of the brackets has an open notch in which the mahl rests, while the other has an opening into which the end of the mahl is inserted. While this is fairly useful, it is quite complicated, cumbersome, and likely to be expensive to manufacture and purchase. Additionally, use of the Oliver device is involved, requiring two hands to adjust each vertical support.

What none of the prior art have tried, and what embodiments disclose herein propose, is to provide a step-wise vertical adjustment and support on both ends of the mahl that can be operated with one hand. Embodiments employ two vertical members that include spaced-apart supports on which ends of the mahl can rest. For example, pegs can be used in the vertical members, allowing the artist to place the mahl horizontally at a position of his or her choosing simply by lifting the mahl with a free hand and placing the mahl on the appropriate pegs. Further, embodiments allow artists to place the mahl at an angle by putting one end of the mahl on a higher peg than the other end of the mahl. The vertical members can be part of a frame with top and bottom rails extending between the vertical members. The bottom member can act as a support in embodiments, resting on the easel tray.

Embodiments additionally comprise a vertical member, such as a second mahl, that preferably hangs down from a top horizontal rail and rests on the first mahl. Additionally, the vertical mahl is preferably slidable along the top rail to allow adjustment of the point of intersection between the first and second mahl. Thus, an artist can place the first mahl at a desired vertical location and, if the artist desires additional assistance, can hang the second mahl from the top rail, sliding it to its desired location. In embodiments including the sliding vertical second mahl, the top rail preferably includes front and rear members, the ends of which are mounted on the fronts and backs of the tops of the vertical members, creating a gap between the front and rear top rail members. The vertical mahl then includes a slide sized to fit in the gap so that pivoting is substantially eliminated.

Embodiments thus disclose a mahl support that can be used and adjusted with one hand, eliminating the need for the artist to hold the mahl or to lay down a work tool to adjust the position of the mahl in the support. Embodiments further provide a vertical mahl that can be used and adjusted with one hand, again eliminating the need for the artist to hold the mahl or to lay down a work tool to adjust the position of the vertical mahl.

DESCRIPTION

Figure 1:
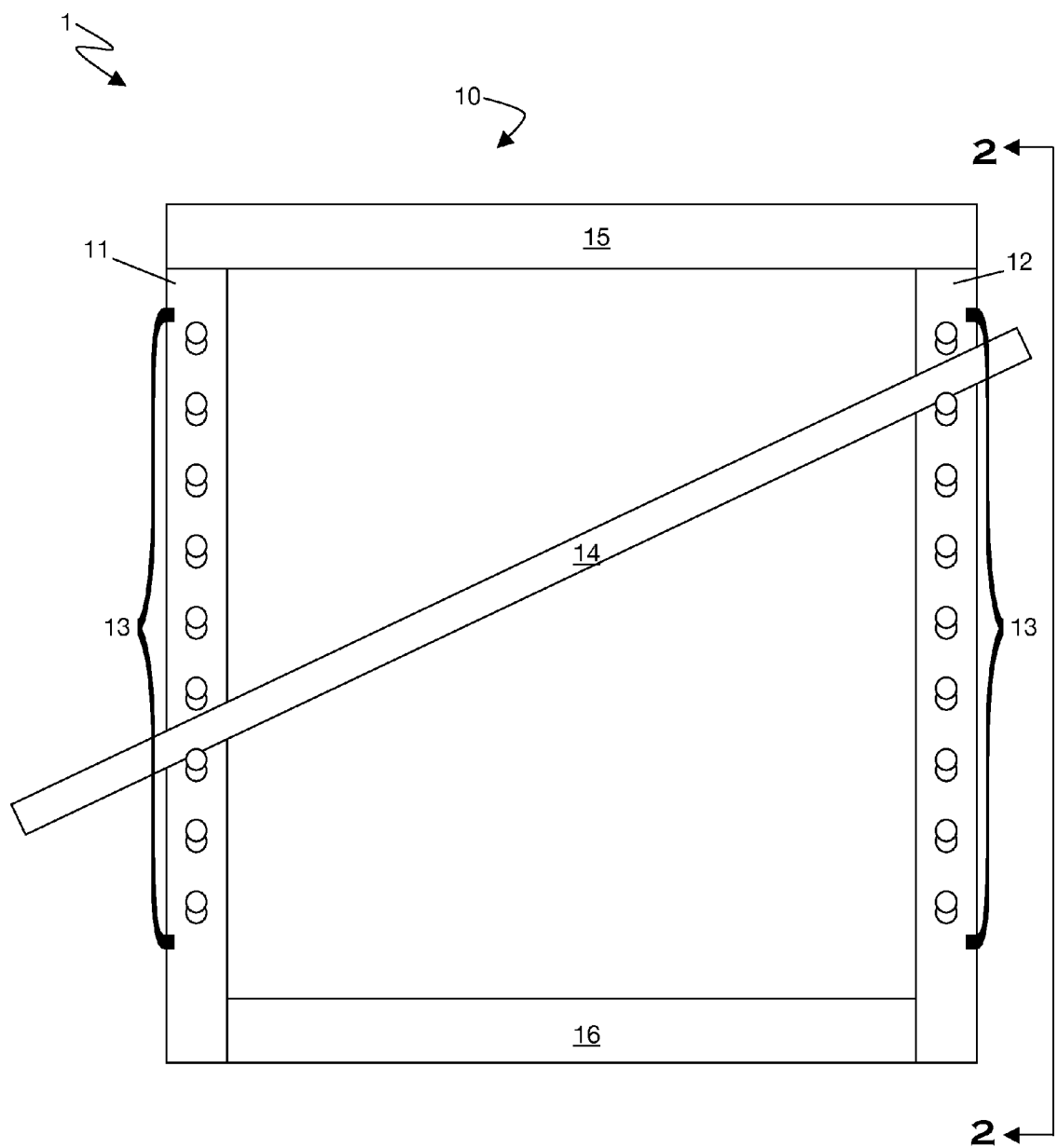
FIG. 1 is a front view of an improved artist assistive device according to embodiments and supporting a mahl.
Figure 2:
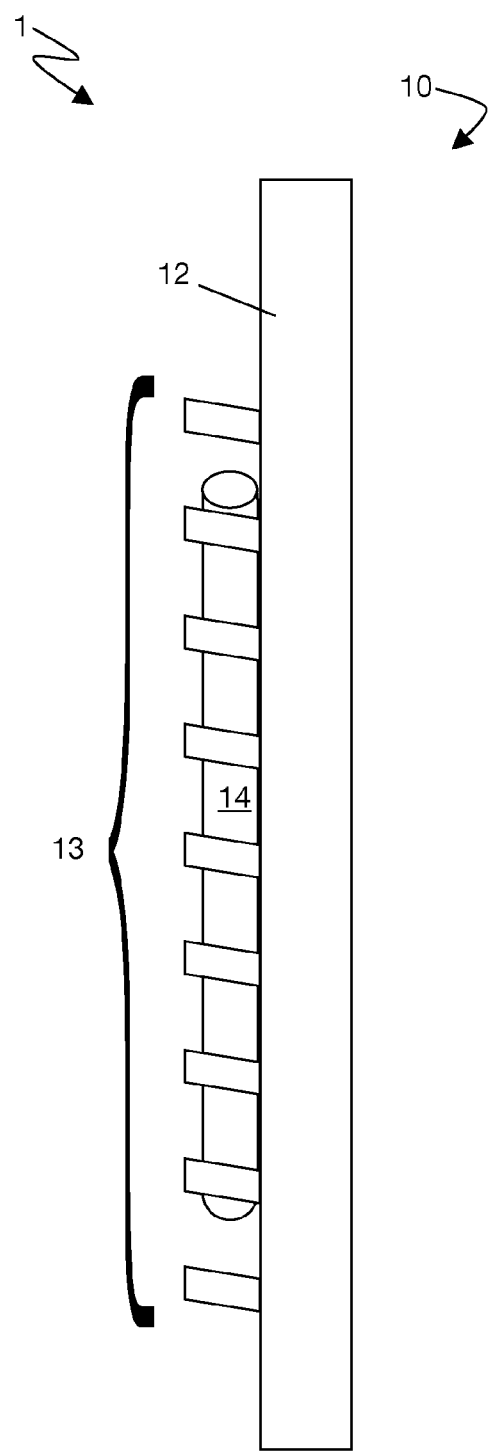
FIG. 2 is a side view of the embodiment of FIG. 1 taken along the line 2-2 of FIG. 1.

As seen in FIG. 1, embodiments of an artist assistive device 1 comprise a frame 10 with two vertical members 11, 12 that have spaced-apart supports 13 for a mahl 14. The supports 13 according to embodiments are preferably pegs, but other suitable supports could be used. The pegs are preferably inclined with the free ends higher than the ends attached to the vertical members to more securely support the mahl. Embodiments preferably also join the vertical members 11, 12 with top and bottom rails 15, 16. In embodiments with no adjustable second mahl, the vertical members, top rail, and bottom rail can be substantially equal in thickness, forming a frame from which the pegs project in the vertical members, as seen in FIGS. 1 and 2.

Figure 3:
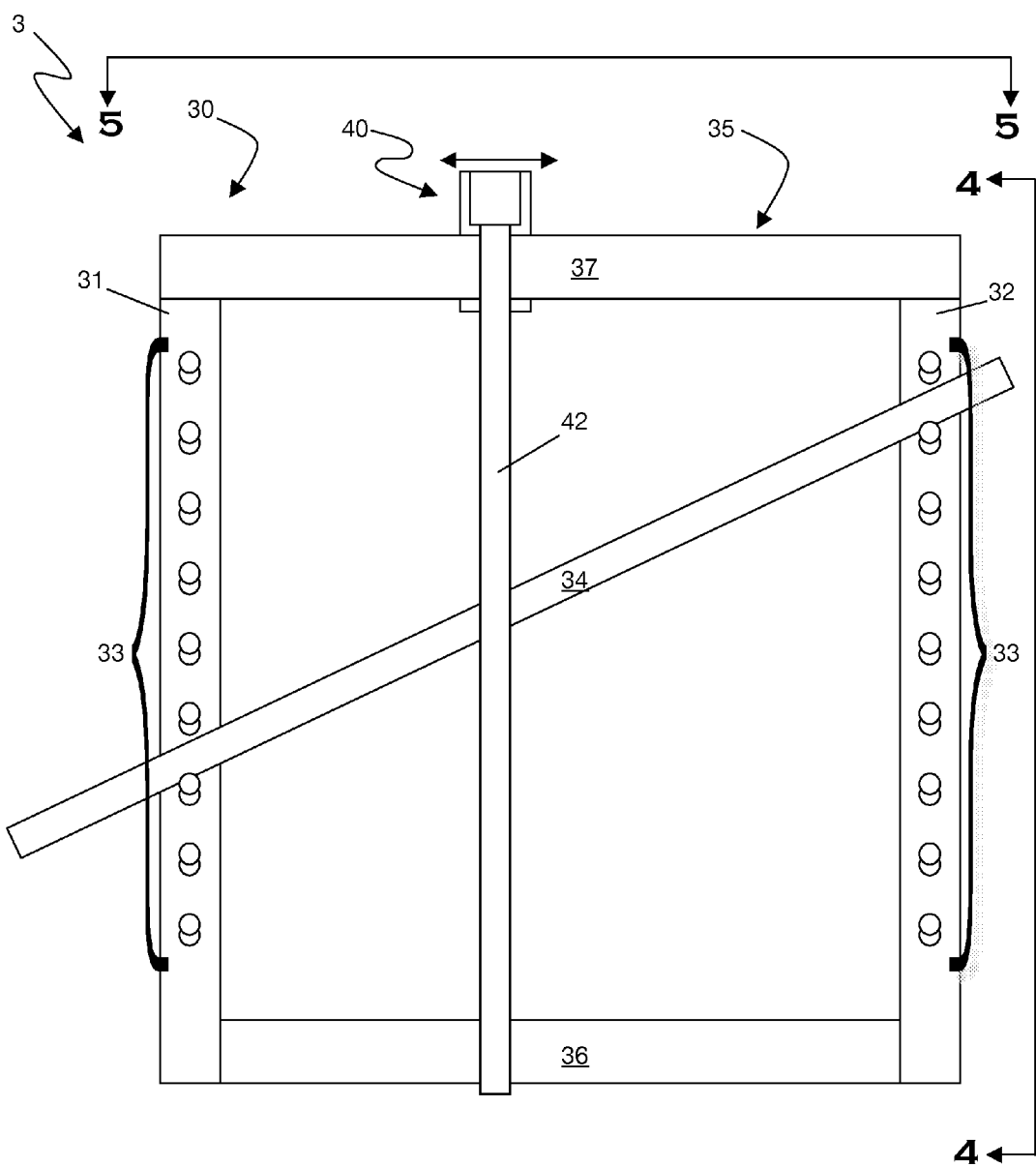
FIG. 3 is a front view of an improved artist assistive device according to embodiments supporting a first mahl and a second, vertical mahl.
Figure 4:
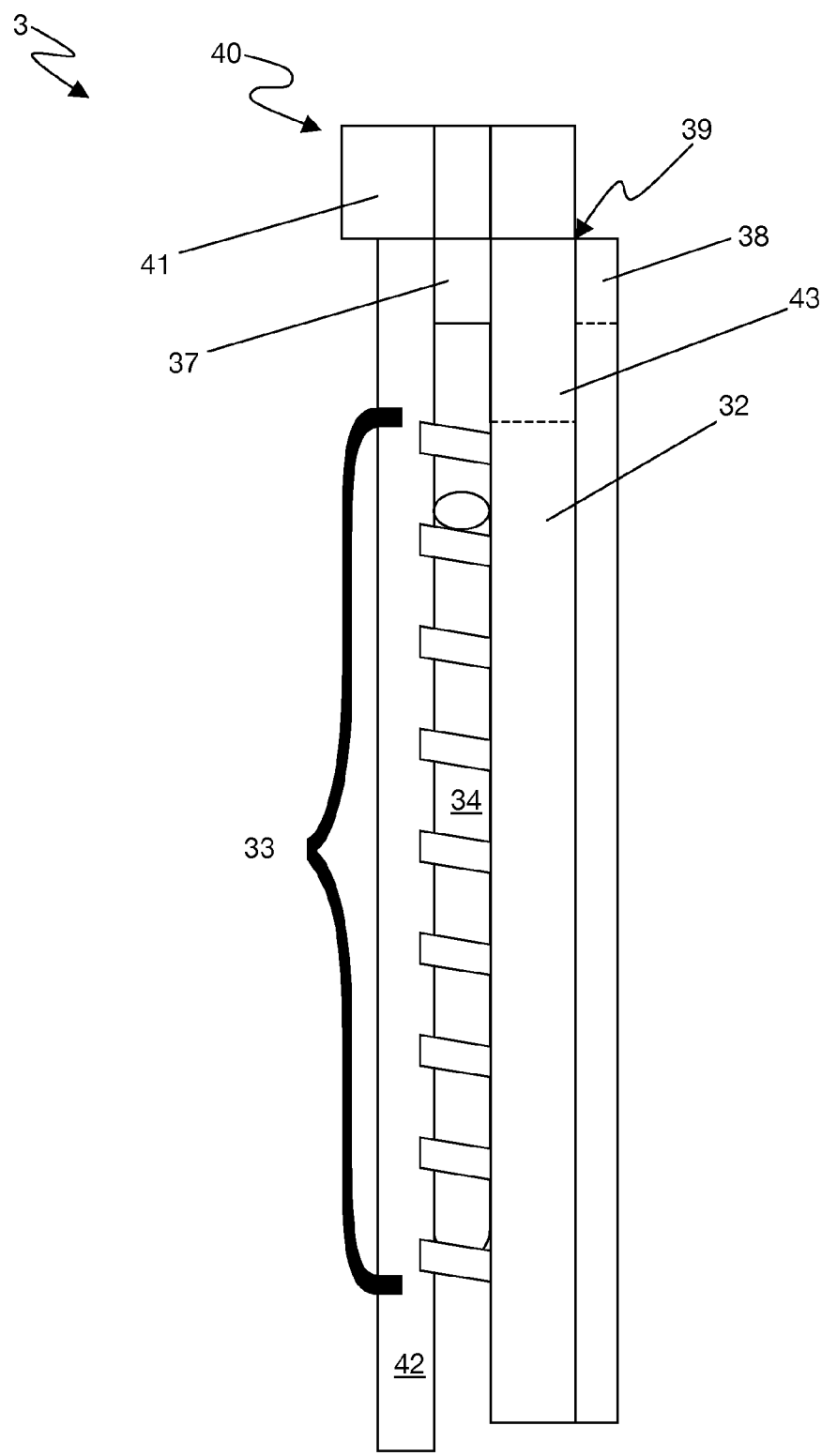
FIG. 4 is a side view of the embodiment of FIG. 3 taken along the line 4-4 of FIG. 3.
Figure 5:
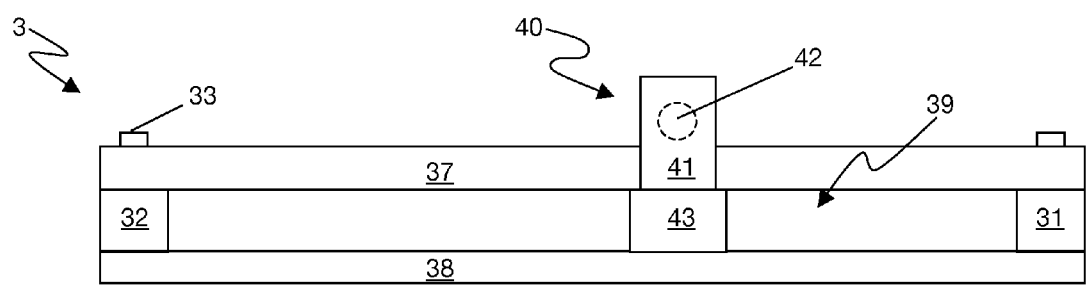
FIG. 5 is a top view of the embodiment of FIG. 3 taken along the line 5-5 of FIG. 3.
Figure 6:
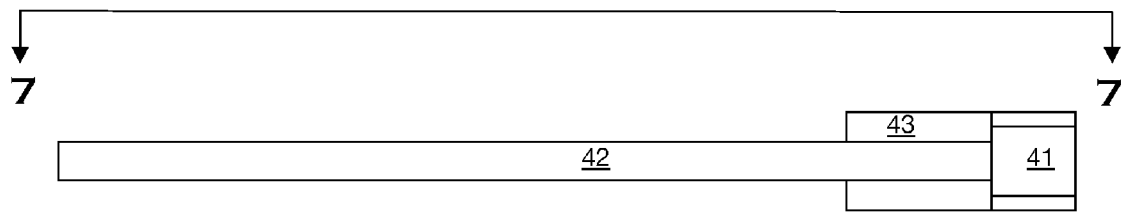
FIG. 6 is a front view of the second mahl of the embodiment of FIG. 3.
Figure 7:
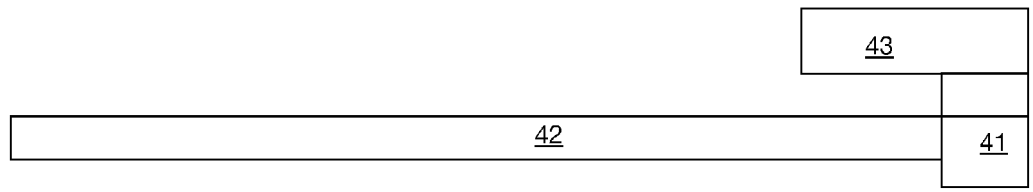
FIG. 7 is a side view of the second mahl of the embodiment of FIG. 6 taken along the line 7-7 in FIG. 6.

An embodiment including a second mahl is shown in FIGS. 3 and 4. Here, the assistive device 3 includes vertical members 31, 32 that carry supports 33, such as pegs, that can support a first mahl 34. The device 3 includes top and bottom rails 35, 36 that connect the vertical members 31, 32. Preferably, the top rail includes front and rear top rail members 37, 38 forming a gap 39 between the front and rear top rail members 37, 38. As seen in the FIGS., a slide 40 is preferably formed such that it hangs in the gap 39 with substantially no pivoting, a top portion 41 of the slide including a support for the second mahl 42 and a block 43 of the slide 40 hanging in the gap 39. In embodiments, the second mahl 42 is permanently attached to the slide 40 to facilitate use and adjustment. For example, the second mahl 42 can be a dowel inserted into a bore or the like in a portion of the slide 40 extending toward the artist from the slide when the slide 40 is mounted in the gap and can be affixed therein through known techniques, such as a friction fit, adhesive, screws or nails, or other suitable techniques or combinations thereof.

In use, as seen in FIGS. 1 and 3, the first mahl 14 or 34 is placed in a desired set of pegs 13 or 33. The artist then can rest his or her hand on the mahl 14 or 34 to work without occupying the other hand. For those so desiring, the free hand can be used to assist the work hand in whatever task the artist pursues. If the artist requires additional stabilization and/or guidance, with the embodiment of FIG. 3 the artist simply inserts the slide 40 of the second mahl 42 into the top rail gap 39, moves the slide 40 to the desired position, and works.

It will be appreciated that various of the above-disclosed and other features and functions, or alternatives thereof, may be desirably combined into many other different systems or applications. It will also be noted that various presently unforeseen or unanticipated alternatives, modifications, variations or improvements therein may be subsequently made by those skilled in the art which are also intended to be encompassed by the following claims.

What is claimed is:

1. An artist assistive device comprising:
   two vertical members;
   a plurality of supports mounted in each vertical member;
   a mahlstick selectively supported by the supports;
   a top rail joining top end of one vertical member to a top end of the other vertical member;
   wherein the top rail comprises front and rear top rail members providing a top rail gap; and
   wherein the mahl is a first mahlstick and further comprising a second mahlstick and a slide supporting the second mahlstick, the slide further being selectively inserted in the top rail gap, thereby allowing sliding adjustment of the second mahl along the top rail.

2. The device of claim 1 wherein the supports are pegs projecting from the vertical members, the pegs being substantially equally spaced apart along each vertical member.

3. The device of claim 1 further comprising a bottom rail joining a bottom end of one vertical member to a bottom end of the other vertical member and selectively supporting the vertical members.

4. The device of claim 1 wherein the second mahlstick hangs over the first mahlstick.

5. An artist assistive device comprising:
   at least two vertical supports arranged in spaced apart relation to allow access to a work surface when the device is placed thereover;
   a plurality of supports mounted on each vertical member in spaced apart relationship along a longitudinal axis of each vertical member, spacing between pairs of supports on a respective vertical support accommodating selective positioning of a mahl therebetween;
   at least one top rail member connected to and connecting at least two of the vertical supports;
   wherein the at least one top rail member comprises front and rear top rail members in substantially parallel spaced apart relationship providing a top rail gap therebetween; and
   wherein the mahlstick is a first mahlstick and the device further comprises a second mahlstick and a slide supporting the second mahlstick, the slide further being selectively inserted in the top rail gap, thereby allowing sliding adjustment of the second mahlstick along the top rail.

6. The device of claim 5 wherein the supports are pegs projecting from the vertical members, the pegs being substantially equally spaced apart along each vertical member.

7. The device of claim 5 further comprising a bottom rail joining a bottom end of one vertical member to a bottom end of another vertical member and supporting the vertical members.

8. The device of claim 5 wherein the second mahlstick hangs over the first mahlstick.

9. An artist assistive device comprising:
at least two vertical supports arranged in spaced apart relation to allow access to a work surface when the device is placed thereover;
a plurality of supports mounted on each vertical member in spaced apart relationship along a longitudinal axis of each vertical member, spacing between pairs of supports on a respective vertical support accommodating selective positioning of a mahl therebetween;
at least one top rail member connected to and connecting at least two of the vertical supports, the at least one top rail member comprising front and rear top rail members in substantially parallel spaced apart relationship providing a top rail gap therebetween; and
wherein the mahlstick is a first mahlstick and the device further comprises a second mahlstick and a slide supporting the second mahlstick, the slide further being selectively inserted in the top rail gap and slideably supported thereby.

10. The device of claim 9 wherein the supports are pegs projecting from the vertical members, the pegs being substantially equally spaced apart along each vertical member.

11. The device of claim 9 further comprising a bottom rail joining a bottom end of one vertical member to a bottom end of another vertical member and supporting the vertical members.

12. The device of claim 9 wherein the slideable support of the slide in the top rail gap allows sliding adjustment of the second mahlstick along the top rail.

13. The device of claim 9 wherein the first and second mahlstick provide support and guidance for a hand.

* * * * *